United States Patent [19]

Lowes

[11] Patent Number: 4,637,454
[45] Date of Patent: Jan. 20, 1987

[54] WIDE RANGE TEMPERATURE CONTROL SYSTEM FOR FLUIDS

[75] Inventor: Albert R. Lowes, Fremont, Calif.

[73] Assignee: Mydax, Inc., Auburn, Calif.

[21] Appl. No.: 718,160

[22] Filed: Apr. 1, 1985

[51] Int. Cl.$^4$ .................. F25B 29/00; G05D 23/00; B60H 1/00; B61D 27/00

[52] U.S. Cl. ................................. 165/36; 165/26; 165/39; 165/40

[58] Field of Search ............... 165/35, 36, 37, 39, 165/40, 26, 27

[56] References Cited

U.S. PATENT DOCUMENTS

| | | | |
|---|---|---|---|
| 2,254,917 | 9/1941 | Schroder | 165/35 |
| 2,432,186 | 12/1947 | Whann | 165/40 |
| 2,433,420 | 12/1947 | Booth | 165/37 |
| 2,788,176 | 4/1957 | Andersen | 165/36 |
| 2,975,308 | 3/1961 | Kilbourne | 165/37 |
| 3,512,580 | 5/1970 | Kyroudis | 165/36 |
| 3,852,147 | 12/1974 | Wilson | 165/36 |
| 4,095,644 | 6/1978 | Huff | 165/13 |
| 4,367,785 | 1/1983 | Allen | 165/2 |

FOREIGN PATENT DOCUMENTS 905590 12/1945 France .

OTHER PUBLICATIONS

Product Specification Sheet, "Tempflow TM -FX Temperature Sensitive Flow Control Valve", Bay Voltex Corporation, 1982.

*Primary Examiner*—William R. Cline
*Assistant Examiner*—John K. Ford
*Attorney, Agent, or Firm*—David B. Harrison

[57] ABSTRACT

A wide range temperature control system for controlling and maintaining the temperature of a first cooling liquid in an indirect heat exchanger at a predetermined setpoint within a wide range of temperatures is disclosed. The system proportions flow of a second cooling liquid between a cooling coil located in the heat exchanger and a bypass path. Flow through the bypass path is regulated by a temperature sensitive valve responsive to outflow temperature of the second cooling liquid from the heat exchanger. Bypassed flow mixes with the outflow from the heat exchanger and thereby establishes and maintains the temperature sensitive valve in a proportional flow mode. The flow of second cooling liquid through the cooling coil is proportioned to the differential in temperature between the second cooling liquid and the first cooling liquid and to the dynamic heat conditions within the heat exchanger at any time. The heat exchanger is thereby enabled to provide precise or "tight" temperature regulation over a wide range of setpoint temperatures.

5 Claims, 2 Drawing Figures

WIDE RANGE TEMPERATURE CONTROL SYSTEM FOR FLUIDS

BACKGROUND OF THE INVENTION

The present invention relates to control systems for indirect heat exchange. More particularly, the present invention relates to a control system providing proportional bypass to control the characteristics of an indirect heat exchanger over a wide range of heat exchange setpoints.

Indirect heat exchangers are known and are used widely for adding and removing heat to and from a heat carrying medium, usually a liquid such as water, glycol or oil. And, many different forms of control systems for indirect heat exchangers are also known.

Examples of prior approaches are found in the following documents which were considered during preparation of the application leading to this patent: U.S. Pat. No. 4,367,785 to Allen; U.S. Pat. No. 4,095,644 to Huff; U.S. Pat. No. 2,254,917 to E. Schroder; and, French Pat. No. 905,590 to Landis & Gyr S.A.

A hitherto unsolved problem relating to heat exchange control related to the need for precise setpoint temperature regulation at a predetermined setpoint within a wide temperature range.

SUMMARY AND OBJECTS OF THE PRESENT INVENTION

A general object of the present invention is to provide a temperature control system for an indirect heat exchanger which operates over a wide temperature range in a manner so as to overcome limitations and drawbacks of the prior art.

A more specific object of the present invention is to provide an improved heat exchanger of standardized size and formed of low cost components in accordance with an elegantly simple design which provides positive temperature regulation at a setpoint within a wide temperature range.

A wide range temperature control system for controlling and maintaining the temperature of a first cooling liquid at a predetermined setpoint within a wide range of temperatures includes an indirect heat exchanger having a cooling coil in the exchanger for carrying a flow of a second cooling liquid from a supply for drawing off heat from the first cooling liquid. The system further includes a flow restrictor for creating a constant or near constant flow rate of the second cooling liquid from the supply and having a flow restricted output of the second cooling liquid. A primary flow path communicating between the output of the flow restrictor and an inlet of the cooling coil. The primary flow path includes a pressure control valve for creating a predetermined back pressure and a flow valve for controlling flow of second cooling liquid through the cooling coil.

A bypass flow connects from the flow restrictor output through a flow control element of a temperature proportional control valve to a junction with an outflow of the cooling coil. The junction is located upstream of a temperature sensitive chamber of the temperature proportional control valve. An outflow communicates from the junction through the temperature sensitive chamber to a discharge point for discharge of the second cooling liquid.

A temperature sensor including a setpoint control for sensing temperature of said first cooling liquid at its outflow from the heat exchanger, for receiving a preset setpoint temperature and for opening the flow valve when sensed outflow temperature of the first cooling liquid is above the setpoint and for closing the flow valve when sensed outflow temperature is below the setpoint.

The temperature proportional control valve controls flow of second cooling liquid through the cooling coil by regulating the amount of bypass flow passing through its flow control element in relation to temperature sensed in its temperature sensitive chamber. In this manner, the flow of second cooling liquid through the cooling coil is proportioned to the differential in temperature between the second cooling liquid and the first cooling liquid and to the dynamic heat conditions within the heat exchanger at any time. The heat exchanger is thereby enabled to provide precise or "tight" temperature regulation over a wide range of setpoint temperatures.

Preferably, the second cooling liquid is water drawn from a city or facilities water supply. Also, under certain circumstances performance of the heat exchanger may be enhanced by providing a heating element for heating the first cooling liquid prior to its passage into the heat exchanger. The heating element may be external to the heat exchanger, or it may be advantageously contained alongside the cooling coil within the heat exchanger.

These and other objects, advantages and features of the present invention will be further appreciated and understood from a consideration of the following detailed description of a preferred embodiment, presented in conjunction with the accompanying drawing.

DETAILED DESCRIPTION OF A PREFERRED EMBODIMENT

Figure 1:
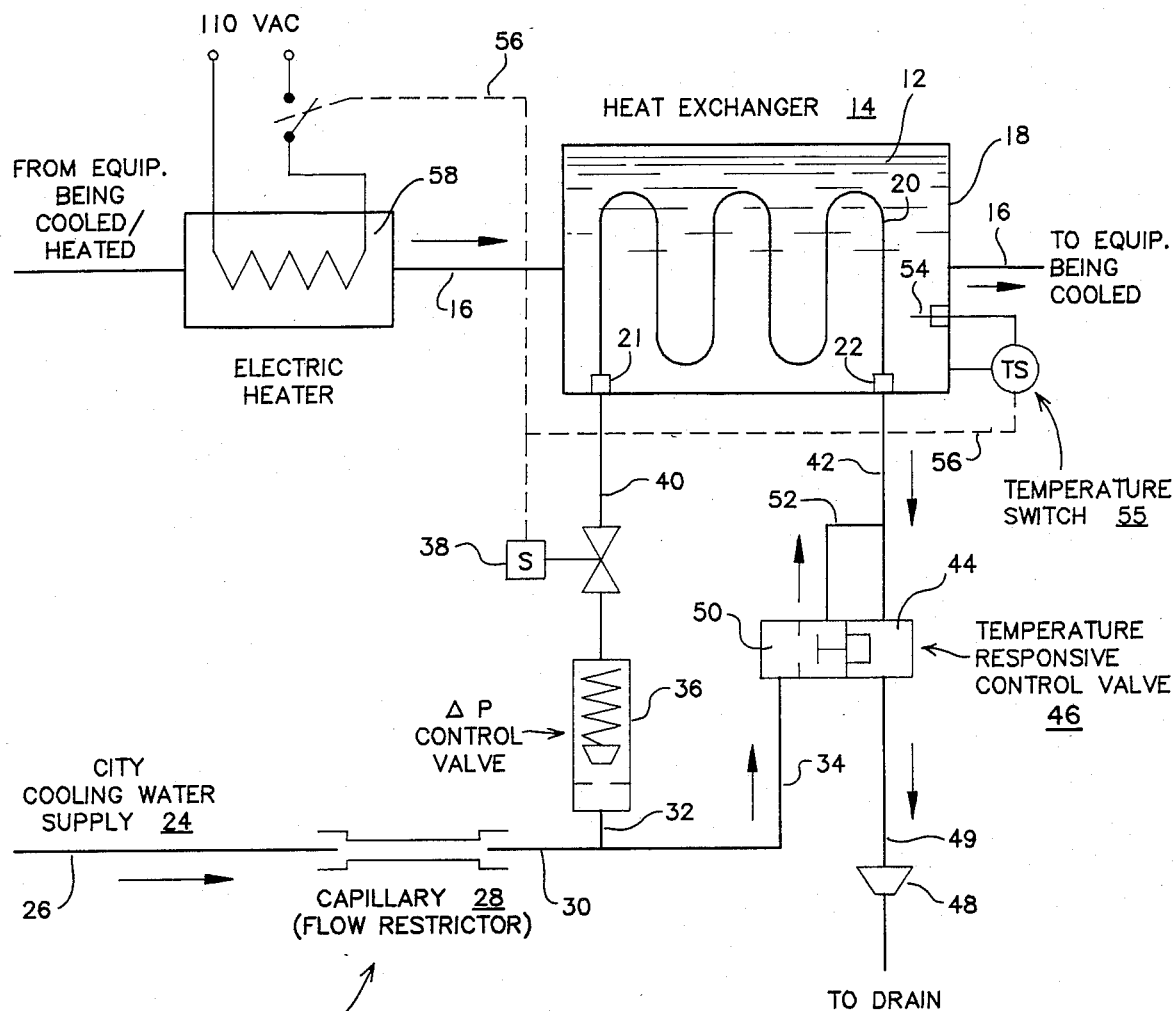
FIG. 1 represents schematically one preferred embodiment of a wide range temperature control system incorporating the principles of the present invention.

A wide range temperature control system 10, shown in FIG. 1, regulates the temperature of a cooling medium 12 such as water or glycol in order to cool equipment of many diverse processes and applications, such as plasma etching, injection molding of plastics, and deposition and diffusion processes in semiconductor fabrication. The cooling medium 12 circulates from the equipment being cooled (not shown in FIG. 1), through a heat exchanger 14, and back to the equipment being cooled, via piping 16 communicating directly with the interior of the exchanger 14, as shown in FIG. 1.

The heat exchanger 14 is sized for a particular heat load, log mean temperature difference and cooling water flow rate for the particular conditions of heat exchange.

The indirect heat exchanger 14 comprises a sump 18 containing a cooling coil 20, preferably formed of bent copper tubing disposed within the sump 18. The cooling medium 12 flows over the coil 20 while city supply cooling water flows through the coil 20. The coil 20 passes through the sidewalls of the sump 20 via an inlet seal 21 and an outflow seal 22 which prohibit intermixture of the medium 12 and the water flowing through the coil 20.

The system 10 regulates the rate of flow of the cooling water through the coil 20 and therefore the temperature of the cooling medium being returned to the equipment being cooled via the conduit 16.

Cooling water at approximately 50° F., for example, from a standard city water supply or a facilities water supply enters the system 10 via a conduit 26 and passes through a capillary flow restrictor 28 to limit incoming water flow rate to a predetermined constant value. An outlet pipe 30 from the capillary restrictor 28 branches into two flow paths, a primary path 32, and a bypass path 34.

The primary path 32 includes a differential pressure control valve 36 which regulates pressure in order to maintain a constant pressure drop (delta P) or back pressure across the pressure valve 36 and also across a solenoid valve 38, downstream in the primary path. An output pipe 40 from the solenoid valve 38 connects to the inlet of the cooling coil 20.

Cooling water leaving the coil 20 via an outflow conduit 42 passes directly through a temperature sensitive chamber 44 in a temperature responsive control valve 46 and then on to a drain 48 or facilities water return via a discharge pipe 49. The temperature sensitive chamber 44 senses the temperature of the heated drain water flowing from the coil 20, but it does not control or regulate its flow. One satisfactory form of temperatures sensitive flow control valve is a TEMP-FLOW-FX (TM) valve available from Bay Voltex Corporation 2110 Rheem Drive, Pleasanton, Calif. 94566-8037, or equivalent.

The bypass path 34 from the line 30 is connected to an inlet of the flow control portion 50 of the temperature responsive control valve 46. A discharge pipe 52 from the flow control portion 50 joins the outflow line 42 of the cooling coil 20 at a location upstream of the temperature sensitive chamber 44 of the valve 46. With the arragement described herein and shown in FIG. 1, opening of the temperature responsive flow control valve 46 causes cooling water to flow in the bypass path 34 and thereby bypass the cooling coil 20, mix with the discharge from the cooling coil 20 and pass through the temperature sensitive chamber of the valve 46 on its way to the drain 48.

The temperature responsive control valve 46 is a proportional device having a fixed setpoint and gain. For example, when the temperature of the water passing through the sensing chamber 44 is at or below e.g. 80° F., the valve 46 is fully closed and no cooling water is bypassed via the bypass path 34. With small increases in temperature above e.g. 80° F., the valve 46 opens porportionally, until it becomes approximately sixty percent (60%) open at e.g. 82.5° F., and fully open at approximately 84° F.

It will be understood by those skilled in the art that during normal operations the valve 46 will never become fully open because the cooling effect of the bypass water via the bypass path 34 from the supply passing through the temperature sensitive chamber 44 always tends to close the valve 46. Thus, even during operations of the system 10 at a very high differential temperatures, the valve 46 is opened only partially.

When the flow control portion 50 of the valve 46 is partially or proportionally opened, flow will be proportioned between the primary path including the cooling coil 20 and the bypass or secondary path. When the flow control portion 50 of the valve 36 is closed, all flow of cooling water will be through the primary path.

Temperature control of the cooling medium 12 will now be explained. A temperature sensor 54 mounted in the sump 18 adjacent the outflow of the cooling medium 12 is connected through a setpoint control 55 and through a control line 56 to control operation of the solenoid valve 38. The sensor 54 energizes and opens the solenoid valve 38 when sump outlet temperature increases above a setpoint temperature preset in the setpoint control 55. When outflow temperature of the cooling medium 12 falls below the setpoint temperature, the solenoid valve 38 is closed. The setpoint temperature is adjustable over a wide range e.g. from 68° F. to 212° F. The setpoint temperature chosen depends upon the needs of the equipment being cooled, and it may be manually set as with the control 55, or it may be controlled by a remote process control/optimization computer.

Figure 2:
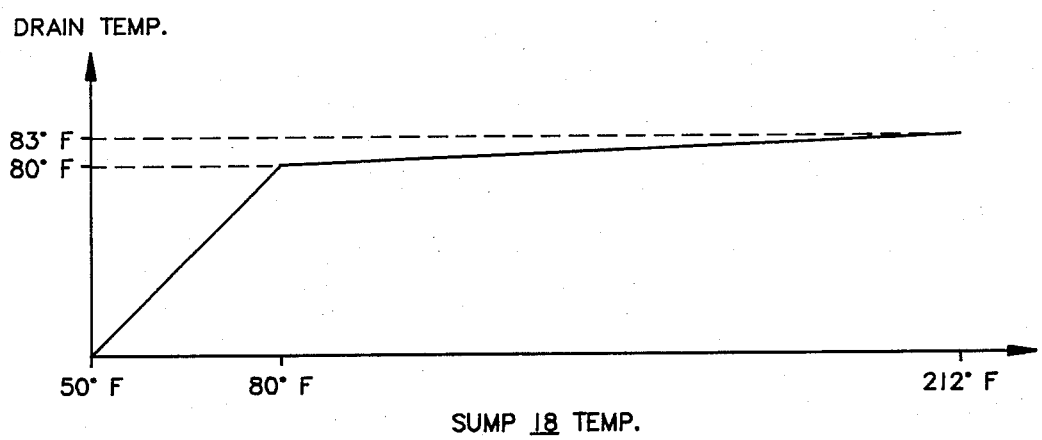
FIG. 2 is a diagram of drain temperature as a function of sump temperature for the wide range temperature control system depicted schematically in FIG. 1.

If the setpoint for the cooling medium 12 is selected to be below e.g. 80° F., the temperature responsive control valve 46 remains closed, since the temperature it is sensing never reaches 80° F., and there is no flow of cooling water through the bypass path 34. When the solenoid valve 38 is opened, indicating that the cooling medium 12 has a temperature above the setpoint temperature set at the control 55, cooling water flows unimpeded through the cooling coil 20. As the cooling water heats up by virtue of drawing heat from the cooling medium 12 in the exchanger 14 to a temperature above 80° F. and passes through the temperature sensitive chamber 44 of the temperature proportional control valve 46, that valve tends to open, and cooling water directly from the city supply 24 mixes with, and cools the outflow from the cooling coil 20. At the same time, the flow through the cooling coil 20 has been proportionally reduced, reducing the amount of effective heat exchange and increasing the cooling effect on the outflow of the cooling water bypassed by the slight opening of the flow control portion 50 of the temperature valve. One immediately perceives that a state of equilibrium will be reached wherein the amount of cooling water bypassed by the temperature valve 46 will be just enough to maintain the outflow temperature of the cooling water at the temperature valve 46 within a very narrow range, for example 3 degrees as the sump temperature increases from 80° F. to 212° F., as graphed in FIG. 2.

Use of the heat exchanger 14 at a higher setpoint, e.g. 140° F., increases the log means temperature difference and therefore the heat transfer rate. With a higher log mean temperature difference, if the flow rate of cooling water through the heat exchanger 14 remains unchanged, excessive temperature excursions will occur in the sump 18 as the solenoid valve 38 rapidly cycles open and closed.

However, with the system 10 as described herein, the temperature responsive control valve 46 automatically opens, thereby proportionally bypassing and reducing the flow of cooling water around the cooling coil 20, and thereby increasing significantly the cycle times of the solenoid valve 38 and smoothing flow rate through the cooling coil 20 until an equilibrium flow is reached, assuming that the cooling medium 12 remains at a fairly constant inflow temperature within the wide range of operation of the system 10.

The bypass flow of cooling water around the cooling coil 20 decreases the Reynolds number and the heat transfer rate of the exchanger 14. In this manner, the heat exchanger characteristics of the cooling coil 20 are inversely adjusted in accordance with the log mean temperature difference dictated by the process. Thus, the same heat exchanger may provide a very closely tolerenced or "tight" temperature control within a wide range of process cooling requirements and parameters.

In some situations it may be appropriate or necessary to raise the temperature of the incoming cooling liquid 12 to a predetermined temperature, for example, the setpoint temperature as set at the control 55. During conditions of equipment startup, where constant temperatures are required, such initial heating may be requisite. An indirect heating element 58 may be provided in the inflow portion of the line 16, as shown in FIG. 1, or the indirect heating element 58 may be installed within the heat exchanger 14 in a manner similar to the cooling coil 20.

The heating element 58 may be implemented with an electric heater element or with a heating element operated by fossil fuel, or facilities steam, for example, depending upon the size of the exchanger and the heat regulation requirements of the equipment being heated or cooled with the aid of the system 10. Preferably, the heating element 58 is controlled by the temperature control 55 so that when the temperature of the cooling liquid 12 is below the setpoint temperature, the heating element is turned, on, and when the temperature of the cooling liquid is above the setpoint temperature, the heating element is turned off.

Thus, operation of the heating element 58 is directly inverse to the operation of the solenoid valve 38. For simplicity in illustrating the invention, however, the control line 56 of FIG. 1 is diagrammatically shown to be controlling both the solenoid valve 38 and the heating element 58, whereas in practice, separate electrical signalling lines would be employed as is well understood by those skilled in the art.

Although this preferred embodiment and example is predicated upon assumed water inlet temperature of 50° F., a setpoint temperature range of 68°–212° F. and a temperature responsive flow control valve setpoint of 80°–82.5° F., it should be understood that the invention is applicable to a wide variation in these values and conditions.

To those skilled in the art to which the present invention pertains, many change in construction and widely varying embodiments and applications will suggest themselves without departing from the spirit and scope of the invention. The disclosure and the description herein are purely illustrative and are not intended to be in any sense limiting.

I claim:

1. A wide range temperature control system for controlling and maintaining the temperature of a first cooling liquid at a predetermined setpoint within a wide range of temperatures with the use of an indirect heat exchanger, a cooling coil in said exchanger for carrying a flow of a second cooling liquid from a supply for drawing off heat from said first cooling liquid, said system comprising:

flow restrictor means for limiting flow rate from said supply and providing a flow restricted output of said second cooling liquid, primary flow means communicating between said output and an inlet of said cooling coil, said primary flow means including pressure control means for creating a constant back pressure, and a flow valve for controlling flow through said cooling coil, bypass flow means communicating from said output through a flow control element of a temperature proportional control valve means to a junction with an outflow of said cooling coil, said junction being located upstream of a temperature sensitive chamber of said temperature proportional control valve means, outflow means communicating from said junction through said temperature sensitive chamber to a discharge point for discharge of said second cooling liquid, temperature sensor means including setpoint means for sensing temperature of said first cooling liquid at its outflow from said heat exchanger, for receiving a preset setpoint temperature and for opening said flow valve when sensed outflow temperature is above a said setpoint and for closing said flow valve when sensed outflow temperature is below said setpoint, wherein said temperature proportional control valve means controls flow of second cooling liquid through said cooling coil by regulating the amount of bypass flow passing through its said flow control element in relation to temperature sensed in its said temperature sensitive chamber.

2. The wide range temperature control system set forth in claim 1 wherein said second cooling liquid is water from a city water supply.

3. The wide range temperature control system set forth in claim 1 further comprising heating means for heating said first cooling liquid prior to its passage into said heat exchanger.

4. The wide range temperature control system set forth in claim 3 wherein said heating means is external to said heat exchanger.

5. The wide range temperature control system set forth in claim 3 wherein said heating means includes a heating element in said heat exchanger.

* * * * *